(12) United States Patent
Lin

(10) Patent No.: US 8,342,563 B2
(45) Date of Patent: Jan. 1, 2013

(54) JOINT PROTECTING DEVICE FOR BABY STROLLER

(76) Inventor: Kao-Hsien Lin, Taipei (TW)

( * ) Notice: Subject to any disclaimer, the term of this patent is extended or adjusted under 35 U.S.C. 154(b) by 84 days.

(21) Appl. No.: 13/009,081

(22) Filed: Jan. 19, 2011

(65) Prior Publication Data

US 2012/0183345 A1 Jul. 19, 2012

(51) Int. Cl.
*B62B 7/06* (2006.01)

(52) U.S. Cl. .......................... 280/642; 403/23

(58) Field of Classification Search .............. 403/23; 280/639, 642
See application file for complete search history.

(56) References Cited

U.S. PATENT DOCUMENTS

| | | | | |
|---|---|---|---|---|
| 2,074,102 A | * | 3/1937 | Christy | 33/27.02 |
| 5,660,435 A | * | 8/1997 | Eichhorn | 297/219.12 |
| 6,062,587 A | * | 5/2000 | Cabagnero | 280/642 |
| D438,149 S | * | 2/2001 | Baechler | D12/133 |
| 6,523,853 B1 | * | 2/2003 | Cheng | 280/642 |
| 6,886,851 B2 | * | 5/2005 | Chen | 280/642 |
| 6,991,248 B2 | * | 1/2006 | Valdez et al. | 280/647 |
| 2010/0308562 A1 | * | 12/2010 | Valdez et al. | 280/642 |
| 2011/0181024 A1 | * | 7/2011 | Chicca | 280/642 |

* cited by examiner

*Primary Examiner* — Joshua Kennedy

(57) ABSTRACT

A joint protecting device for a baby stroller, the baby stroller has a pair of guarding housings on the outer surface of two joints on the two lateral sides of the baby stroller. When the baby stroller is collapsed or stretched, each of two upper struts is rotated relatively to a corresponding lower strut on each of the joints and makes one of the two guarding housings rotate about an axle of the joint, thereby the guarding housing obstructs a gap with an angle formed between the joint and the upper strut, and harming by clamping to the baby's fingers can be prevented.

5 Claims, 6 Drawing Sheets

JOINT PROTECTING DEVICE FOR BABY STROLLER

BACKGROUND OF THE INVENTION

1. Field of the Invention

The present invention relates to improvement of a baby stroller structure, and especially to the improvement of joint structures used on a foldable baby stroller having a joint protecting function.

2. Description of the Prior Art

A baby stroller is a carrier provided for seating therein a baby; it is convenient for a patriarch to push the baby stroller with a baby easily. Following development of society, styles of baby strollers get more and more variant, baby strollers sold in the markets are composed each of a plurality of struts and joints for the purpose of folding to reduce volume, that is, a foldable structure is provided for the convenience of storage.

As shown in FIGS. 1, 2, in order to get the above mentioned function of folding, a conventional baby stroller is provided between each set of its upper and lower struts 100, 200 with a joint 300, the joint 300 has on a lateral side of it a pivot portion 301 connecting with the bottom end of the upper strut 100, and is provided with a recessed engaging portion 302 in corresponding by shape with the upper strut 100, the bottom end of the joint 300 is provided with a round hole for connecting the lower strut 200.

The lower strut 200 is fixed in the round hole of the joint 300; when the baby stroller is to be stretched, the upper strut 100 pivots on the pivot portion 301 to the engaging portion 302 relatively to the lower strut 200 and is positioned; thus the baby stroller is stretched for seating of the baby; further, the baby stroller is provided at its bottom with a set of lower cross rods 400 for the purpose of supporting the frame of the baby stroller during stretching the latter, and for stable sliding of the baby stroller; the two rear legs 500 at the two lateral sides of the baby stroller are provided therebetween with a main lock 600; when in stretching the baby stroller, the main lock 600 is in its locking state to warrant that the baby stroller keeps its stretching state; when in collapsing the baby stroller, the main lock 600 shall be unlocked firstly in order that the upper strut 100 is released from engaging of the engaging portion 302, then the upper strut 100 is exerted with force to rotate reversely, and the baby stroller can be collapsed, and can be carried conveniently.

In the above stated structure, although the main lock 600 is designed to warrant that the baby stroller keeps its stretching state, however, there is a gap induced between the upper strut 100 and the joint 300 during stretching or in use; especially when in the process of stretching, if the baby inadvertently grasps the joint, his fingers are highly subjected to being harmed by clamping of the gap area between the upper strut 100 and the engaging portion 302; there have been many cases of harming by clamping babies fingers, hence manufacturers have to provide "cloth covers" for covering the joints, this is on account of not considering safety designing for joints.

Additionally, in use, the upper strut 100 and the lower strut 200 downwardly exerting gravity tends to make the upper strut 100 released from the engaging portion 302 of the joint 300 to form an angle θ, and the joint 300 is provided at an area on a lateral side of the seat where fingers of the baby who is seating on are subjected to getting in, if the baby grasps something at this area, its fingers are highly subjected to being harmed by clamping, that is, this forms a threatening to the safety of the baby.

In view of this, the inventor provides a joint protecting device, it can obstruct the gap with the angle θ formed between the joint and the strut when in collapsing, stretching the baby stroller, thereby can effectively avoid inadvertent touching the gap area and making the baby's fingers harmed by clamping.

SUMMARY OF THE INVENTION

Therefore, the object of the present invention resides in improvement of the joint structure of a baby stroller to obstruct the gap with the angle formed between the joint and the strut when in collapsing, stretching the baby stroller, in order to avoid the baby's fingers from harming by clamping.

For achieving the above object, the joint protecting device for a baby stroller of the present invention has a pair of guarding housings on the outer surface of two joints on the two lateral sides of the baby stroller.

Wherein the joints each is generally in a round shape, and each is fixed on the top of a lower strut, each joint has an axle and a recess to allow pivoting of an upper strut, the bottom of the recess is in a shape in corresponding to that of the upper strut, for the purpose that the upper strut can be stably positioned after pivoting.

Each guarding housing covers over the recess of its corresponding joint, and is in a shape in corresponding to the contour of the joint, and its vertical sectional top portion is in an arc shape; the guarding housing forms two walls at the two lateral sides of the joint, and forms an obstructing plate above the recess of the joint; the two walls each has an axial hole near its central area, the axial hole is pivotally connect to the above mentioned axle of the joint, so that the guarding housing can pivot relatively to the joint.

The guarding housing is provided with a linking hole on the obstructing plate, the linking hole is in a shape meeting that of the upper strut and is slipped over the upper strut, thereby the upper strut can be pivotally connected to the recess after extending through the linking hole; when the upper strut is rotated relatively to the lower strut in the recess of the joint, through the linking hole, it can make the guarding housing rotate about the axle of the joint.

With the above stated structure, when the baby stroller is collapsed or stretched to make the upper strut rotate, and make the guarding housing rotate about the axle of the joint by pushing of the linking hole, the obstructing plate of the guarding housing can sustainingly obstruct the gap with the angle formed between the joint and the strut during rotating, and safety of the baby in use can be increased, the worry about harming by clamping to the baby's fingers can be eliminated.

As compared with the conventional technique, the present invention provided over the outer surface of the joint with the guarding housing can eliminate the worry about harming by clamping to the baby's fingers when the fingers grasp the aforesaid gas area; and thereby safety of use for the baby can be obtained.

The present invention will be apparent after reading the detailed description of the preferred embodiment thereof in reference to the accompanying drawings.

DETAILED DESCRIPTION OF THE PREFERRED EMBODIMENT

Figure 1:
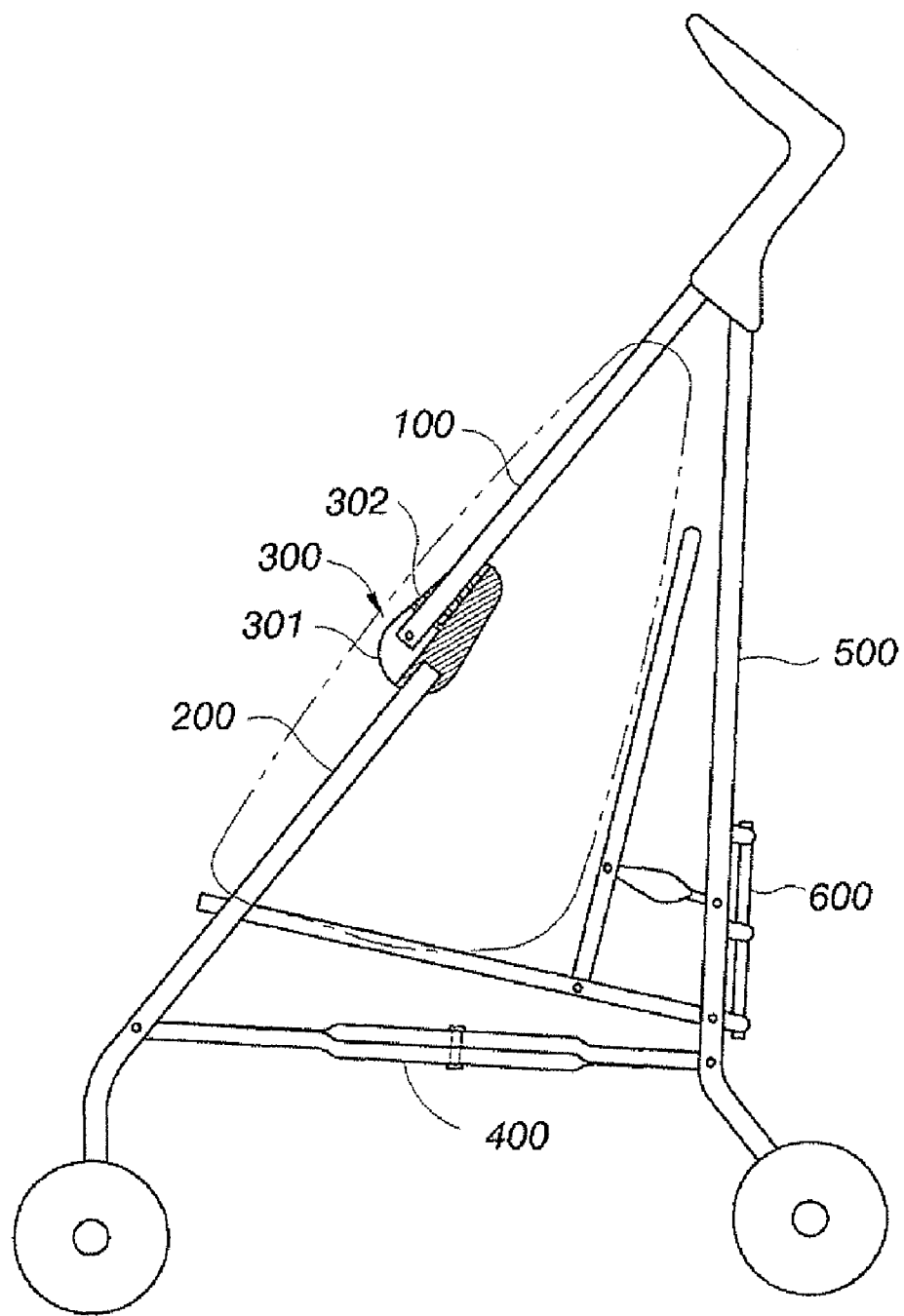
FIG. 1 is a schematic view of the joint structure of a conventional baby stroller.
Figure 2:
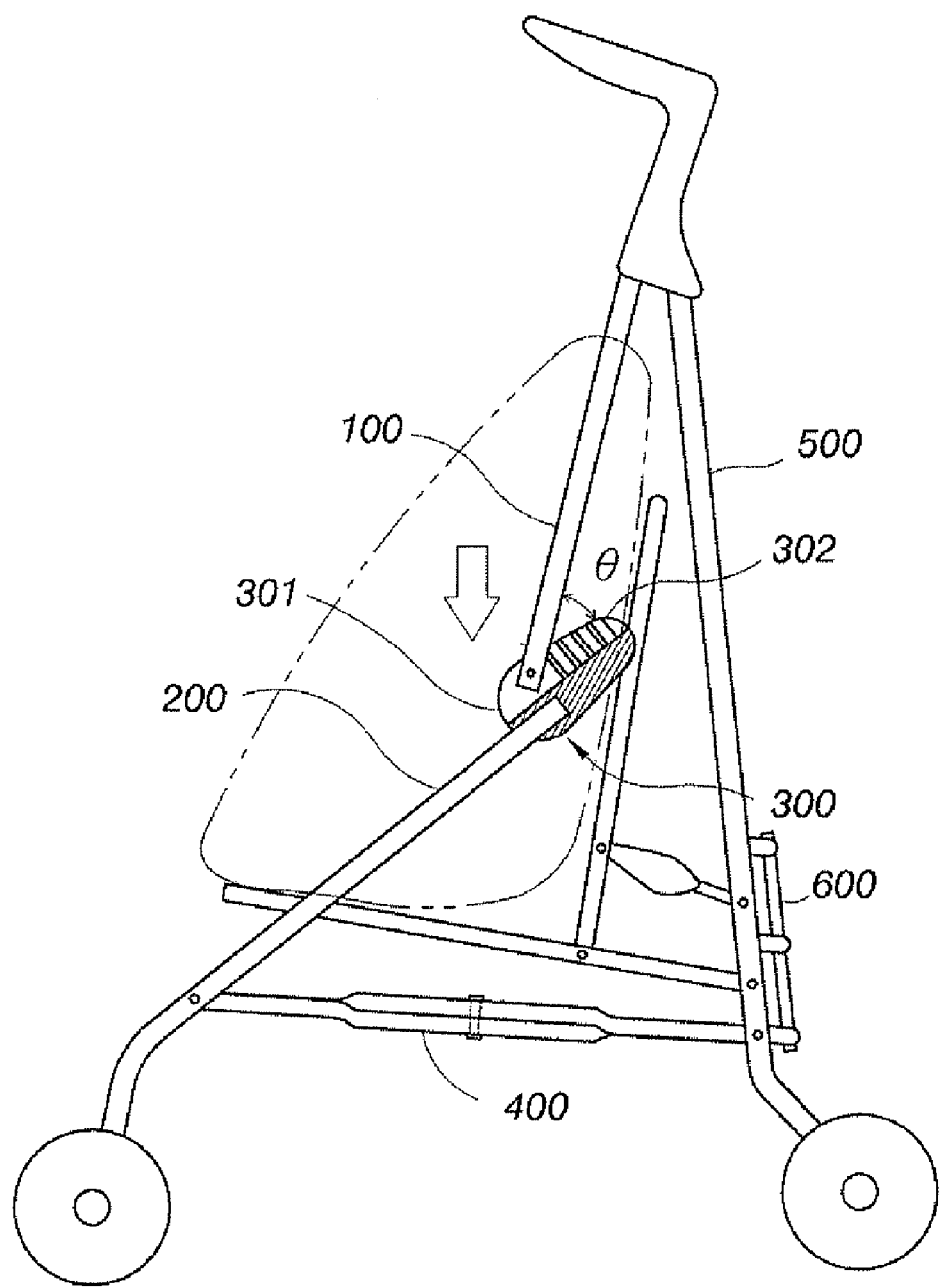
FIG. 2 is another schematic view of the joint structure of the conventional baby stroller.
Figure 3:
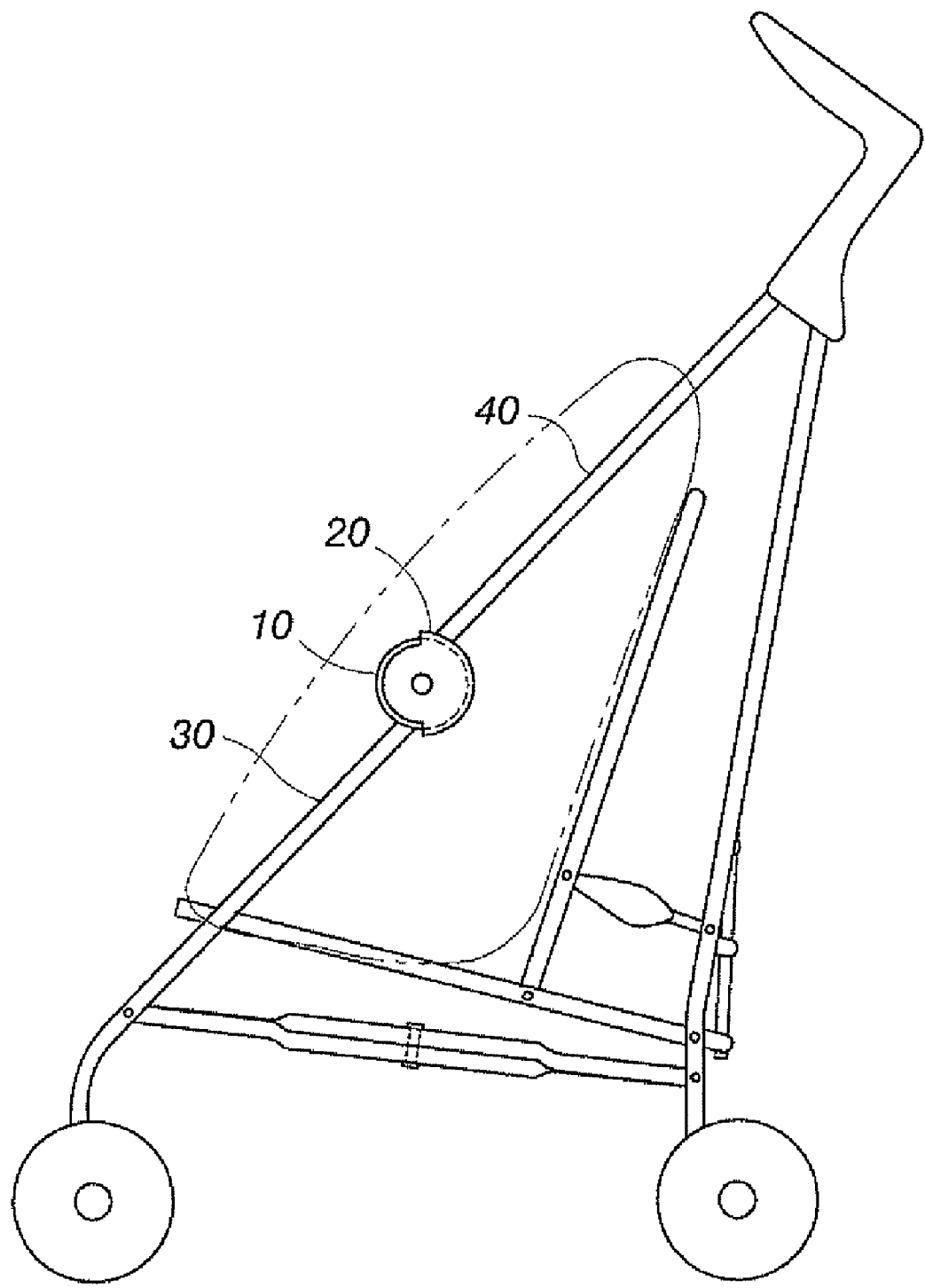
FIG. 3 is a schematic view of a baby stroller showing the position where the device of the present invention allocated.
Figure 4:
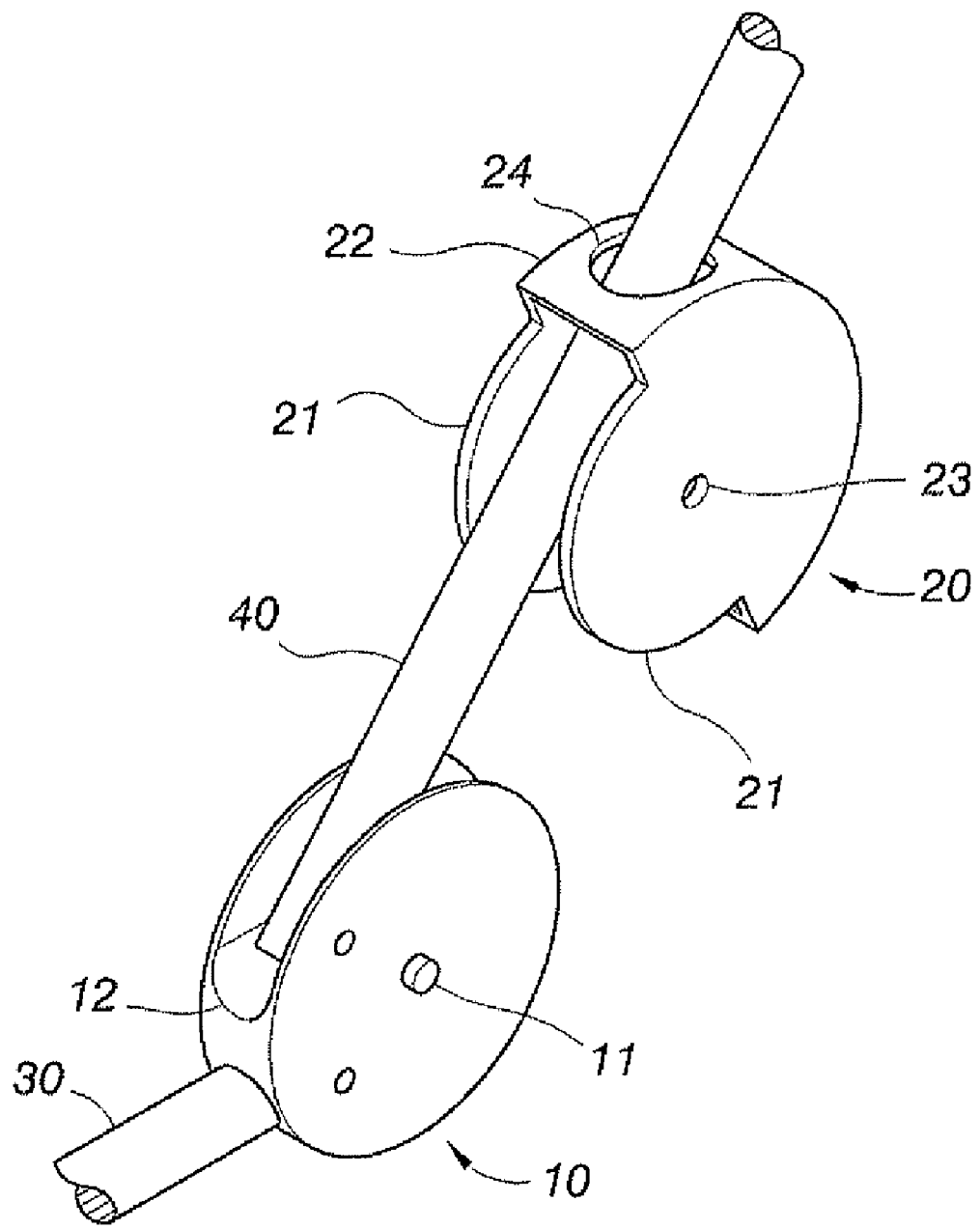
FIG. 4 is an anatomic perspective view of the present invention.

Referring to FIGS. 3 and 4, the joint protecting device for a baby stroller of the present invention has a pair of guarding housings 20 on the outer surface of two joints 10 on the two lateral sides of the baby stroller.

Wherein each joint 10 is generally in a round shape, and is fixed on the top of a lower strut 30, each joint 10 has an axle 11 and a recess 12 to allow pivoting of an upper strut 40, the bottom of the recess 12 is in a shape in corresponding to that of the upper strut 40, for the purpose that the upper strut 40 can be stably positioned after pivoting.

Each guarding housing 20 covers over the recess 12 of its corresponding joint 10, and is in a shape in corresponding to the contour of the joint 10, its vertical sectional top portion is in an arc shape; the guarding housing 20 forms two walls 21 at the two lateral sides of the joint 10, and forms an obstructing plate 22 above the recess 12 of the joint 10; the two walls 21 each has an axial hole 23 near its central area, the axial hole 23 is pivotally connect to the above mentioned axle 11 of the joint 10, so that the guarding housing 20 can pivot relatively to the joint 10.

The guarding housing 20 is provided with a linking hole 24 on the obstructing plate 22, the linking hole 24 is in a shape meeting that of the upper strut 40 and is slipped over the upper strut 40, thereby the upper strut 40 can be pivotally connected to the recess 12 after extending through the linking hole 24; when lower portion of the upper strut 40 is rotated relatively to the lower strut 30 in the recess 12 of the joint 10, through the linking hole 24, it can make the guarding, housing 20 rotate about the axle 11 of the joint 10.

Figure 5:
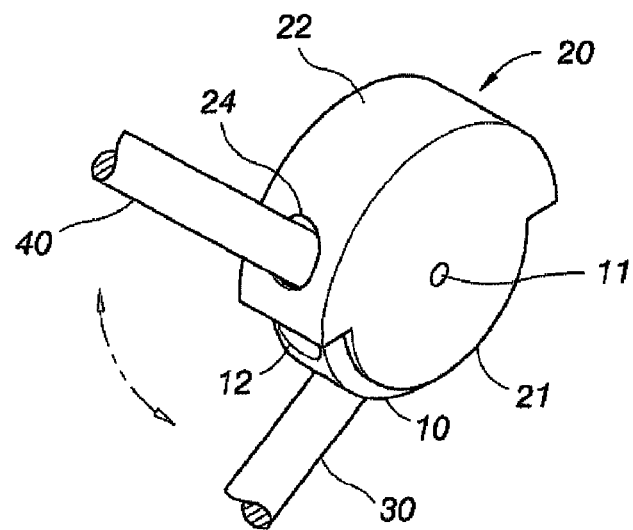
FIG. 5 is a schematic perspective view of the present invention.
Figure 6:
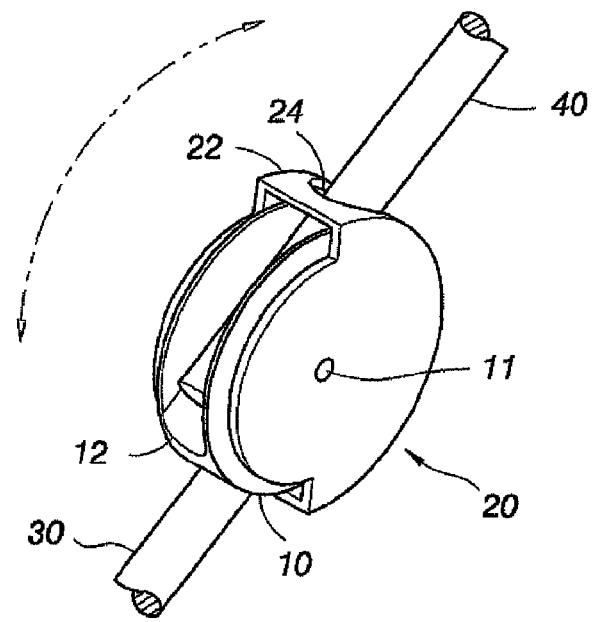
FIG. 6 is another schematic perspective view of the present invention.

As shown in FIGS. 5, 6, with the above stated structure, when the baby stroller is collapsed or stretched to make the upper strut 40 rotate, and make the guarding housing 20 rotate about the axle 11 of the joint 10 by pushing of the linking hole 24, the obstructing plate 22 of the guarding housing 20 can sustainingly obstruct the gap with an angle formed between the joint 10 and the upper strut 40 during rotating, and safety of the baby in use can be increased, the worry about harming by clamping to the baby's fingers can be eliminated.

Figure 7:
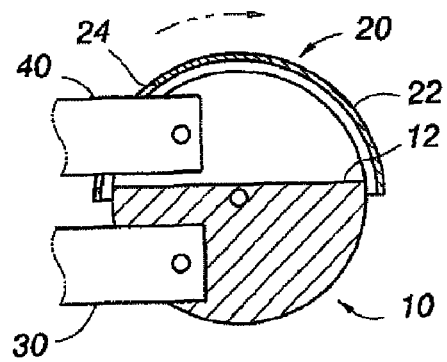
FIG. 7 is a schematic view showing the actions of an upper strut relatively to a guarding housing of the present invention.
Figure 8:
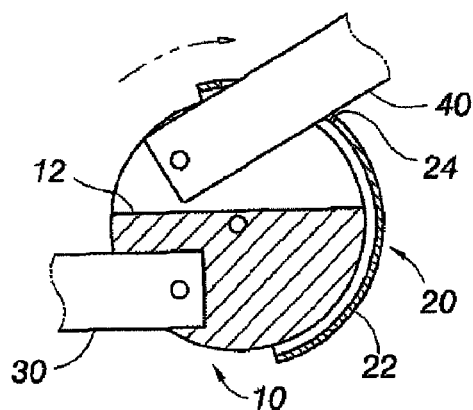
FIG. 8 is another schematic view showing the actions of an upper strut relatively to a guarding housing of the present invention.
Figure 9:
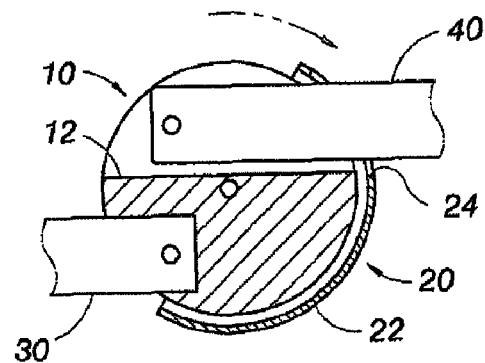
FIG. 9 is a further schematic view showing the actions of an upper strut relatively to a guarding housing of the present invention.

As shown in FIGS. 7 to 9, after stretching the baby stroller, the upper strut 40 is pivoted in the recess 12 and is positioned at the bottom of the latter, the obstructing plate 22 of the guarding housing 20 is brought by the upper strut 40 to sustainingly cover an opposite position of the recess 12. With the guarding housings 20 provided on the outer surface of two joints, when the baby stroller is collapsed or stretched, the guarding housing 20 can obstruct the gap with the angle formed between the joint 10 and the upper strut 40, the worry about harming by clamping to the baby's fingers can be eliminated.

The specification described and the drawings depicted are only for illustrating the preferred embodiment of the present invention, and not forgiving any limitation to the scope of the present invention. It will be apparent that various equivalent modifications or changes made to the elements of the present invention without departing from the spirit of this invention shall also fall within the scope of the appended claims to be protected of this invention.

What is claimed is:

1. A baby stroller comprising:
    an upper strut;
    a lower strut;
    a joint fixed to the lower strut and to the upper strut, the joint configured to provide for pivoting of the upper strut thereon, such that said lower strut and said upper strut pivot relative to each other; and
    a guard housing pivotably disposed on an outer surface of the joint, said guard housing comprising an arcuate guard surface with a linking hole, the upper strut passing through the linking hole, wherein said guard housing forms two walls along two lateral sides of said joint, and guard surface connecting said two walls together;
    wherein rotation of said upper strut relative to said lower strut causes said guard housing to rotate about said joint to cause said guard surface to continuously obstruct a gap in the joint opposite the lower strut created when an angle is formed between said lower strut and said upper strut when collapsing and extending the baby stroller.

2. The baby stroller of claim 1, wherein said joint is circular, said guard housing is in a shape in corresponding to said joint, and the guard surface is semi-circular.

3. The baby stroller of claim 1,
    wherein said two walls each has an axial hole in a respective central area, each axial hole pivotally connected to said joint.

4. The baby stroller of claim 3, wherein said joint has thereon a recess to allow pivoting of said upper strut, a bottom of said recess in a shape corresponding to that of said upper strut, and said guard surface obstructs said recess when said baby stroller is in a collapsed state.

5. The baby stroller of claim 1, wherein said linking hole has a shape corresponding to that of said upper strut.

* * * * *